US009167752B2

(12) United States Patent
Hartsook et al.

(10) Patent No.: US 9,167,752 B2
(45) Date of Patent: *Oct. 27, 2015

(54) NEEDLELESS INOCULATION

(71) Applicant: Monsanto Technology LLC, St. Louis, MO (US)

(72) Inventors: Jeffrey W. Hartsook, Madrid, IA (US); Michael R. Bohnert, Ames, IA (US); David J. Baitinger, Ankeny, IA (US); Ana Paula da Silva Dias, Sycamore, IL (US); Travis J. Frey, Brentwood, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/576,711

(22) Filed: Dec. 19, 2014

(65) Prior Publication Data

US 2015/0101243 A1 Apr. 16, 2015

Related U.S. Application Data

(63) Continuation of application No. 13/574,635, filed as application No. PCT/US2011/022721 on Jan. 27, 2011, now Pat. No. 8,943,746.

(60) Provisional application No. 61/299,755, filed on Jan. 29, 2010.

(51) Int. Cl.

*A01G 7/06* (2006.01)
*A01M 7/00* (2006.01)

(52) U.S. Cl.

CPC ........ *A01G 7/06* (2013.01)

(58) Field of Classification Search

CPC ........ A01G 7/06; A01M 7/00; A01M 7/06
USPC ........ 47/1.5, 57.5, 58.1 R
See application file for complete search history.

(56) References Cited

U.S. PATENT DOCUMENTS

| | | | | |
|---|---|---|---|---|
| 6,514,512 | B1 * | 2/2003 | Puterka et al. | 424/421 |
| 7,905,054 | B1 * | 3/2011 | Metzler | 47/57.5 |
| 8,464,465 | B1 * | 6/2013 | Metzler | 47/57.5 |
| 2002/0104262 | A1 * | 8/2002 | Muhr | 47/57.6 |
| 2009/0120339 | A1 * | 5/2009 | Detweiler et al. | 111/118 |
| 2010/0281771 | A1 * | 11/2010 | Kudo et al. | 47/58.1 LS |

* cited by examiner

*Primary Examiner* — Monica Williams
(74) *Attorney, Agent, or Firm* — Polster Lieder

(57) ABSTRACT

The present disclosure provides systems and methods for inoculating a plurality of plants. In various embodiments, an exemplary method includes spraying a plurality of plants with an inoculum utilizing an automated inoculum spraying subsystem of a mobile inoculation system. The method additionally includes spraying the plurality of plants with a grit medium utilizing an automated grit blasting subsystem of the mobile inoculation system. Spraying the plants with the grit medium inflicts a plurality of wounds to the tissue of the plants on a plurality of surfaces of the plants. The wounds inflicted by the grit medium allow the inoculum to be absorbed into the plants to inoculate the plants.

20 Claims, 5 Drawing Sheets

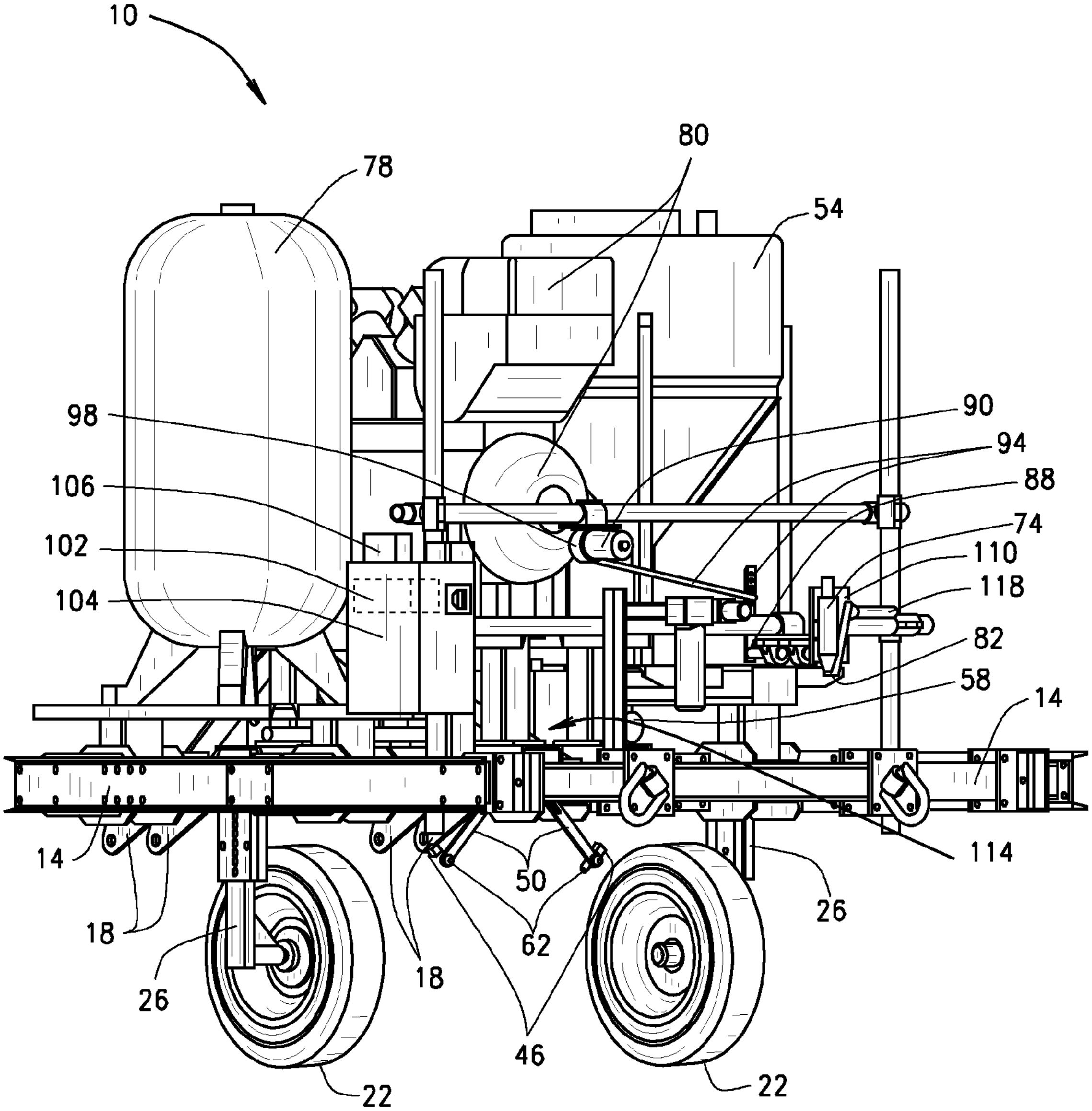
F I G. 1

200

202 — THE INOCULUM AND GRIT NOZZLES ARE POSITIONED AT A SELECTED HEIGHT ABOVE THE GROUND SURFACE

204 — THE AUTOMATED MOBILE INOCULATION SYSTEM IS TRANSPORTED ACROSS THE GROUND SURFACE SUCH THAT THE PLANTS PASS BENEATH THE INOCULUM SPRAY NOZZLE(S) AND THE GRIT SPRAY NOZZLE(S)

206 — EACH PLANT IS SPRAYED WITH AN INOCULUM DISPENSED FROM THE INOCULUM SPRAY NOZZLE(S) TO PROVIDE A SUBSTANTIALLY UNIFORM COVERAGE OF INOCULUM ACROSS THE EXPOSED PLANT SURFACES

208 — EACH PLANT IS SPRAYED WITH A GRIT MEDIUM DISPENSED FROM THE GRIT SPRAY NOZZLE(S) TO INFLICT A SUBSTANTIALLY UNIFORM COVERAGE OF WOUNDS TO THE TISSUE OF THE EXPOSED PLANT SURFACES

210 — THE INOCULUM IS ABSORBED INTO THE PLANT SURFACES VIA THE WOUNDS, THEREBY INOCULATING THE PLANTS

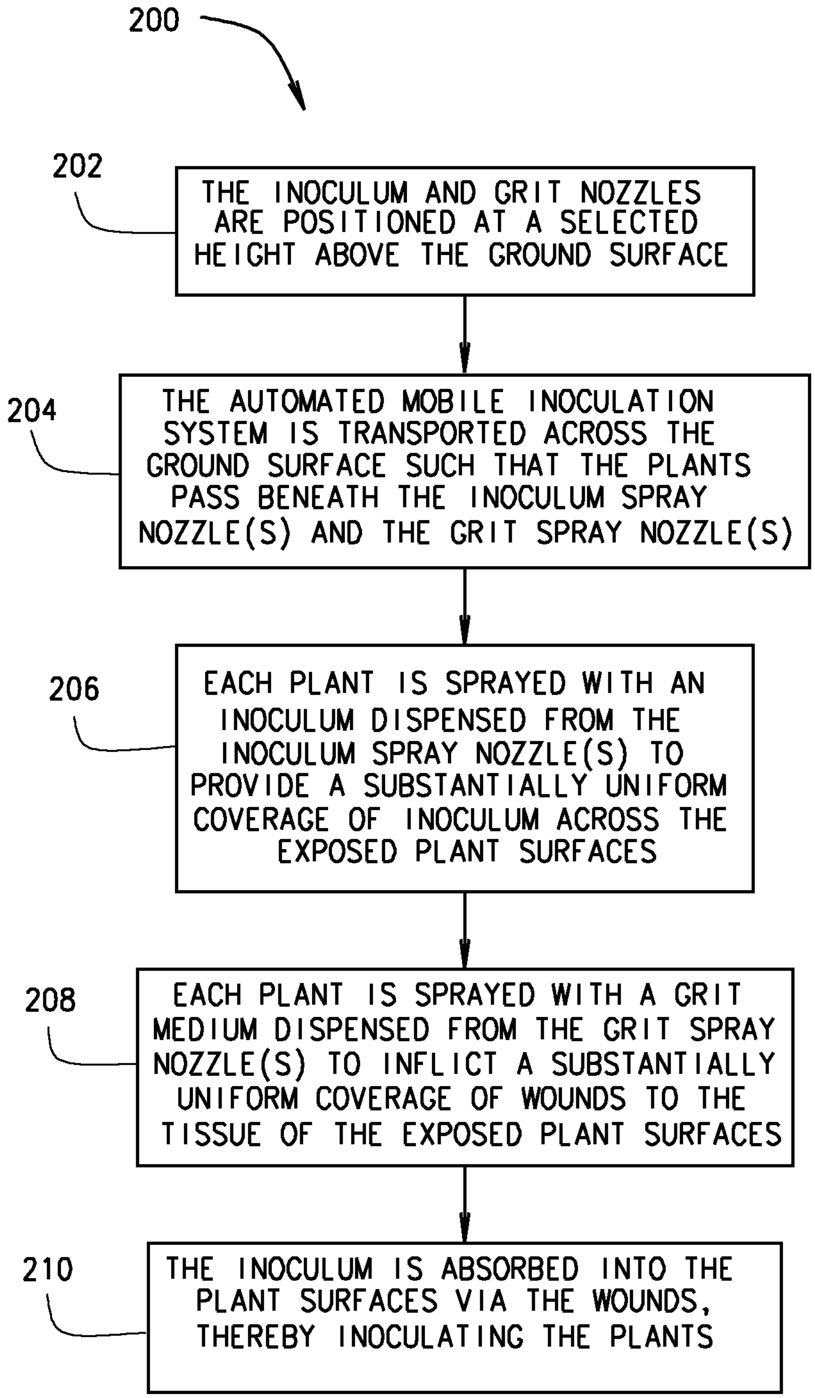

FIG. 4

NEEDLELESS INOCULATION

CROSS-REFERENCE TO RELATED APPLICATIONS

This application is a Continuation of U.S. patent application Ser. No. 13/574,635 filed on Nov. 15, 2012, which is a National Stage of International Application No. PCT/US2011/022721, filed Jan. 27, 2011 claiming the benefit of U.S. Provisional Application No. 61/299,755, filed on Jan. 29, 2010, the disclosures of which are incorporated herein by reference in its entirety.

FIELD

The present teachings relate to systems and methods for inoculating plants with pathogens for disease phenotyping.

BACKGROUND

The statements in this section merely provide background information related to the present disclosure and may not constitute prior art.

In plant breeding and selection processes, genotypic and/or phenotypic data can be gathered from inoculated plants to determine whether particular plants are resistant or susceptible to one or more particular pathogens, such as viral, bacterial or fungal pathogens. Additionally, such genotypic and/or phenotypic data can be gathered from inoculated plants to screen and select plants that possess a particular genetic trait that are resistant to one or more pathogens, and/or to classify a level of susceptibility or resistance of particular plants to one or more pathogens.

Plant inoculation is a tedious process that is typically hand performed by manually injecting plants with the pathogen, manually spraying the pathogen on plants, or manual applying liquid pathogen to a manually abraded leaf. Such hand performed inoculation methods are typically ergonomically unfriendly, the inoculation throughput rate is very low and the accuracy, in terms of consistency of inoculation, is typically sporadic.

SUMMARY

The present disclosure provides automated systems and methods for inoculating a plurality of plants by introducing pathogens, e.g., bacterial, viral or fungal pathogens, into the plant tissue for disease phenotyping and/or genotyping.

In various embodiments, an exemplary method includes spraying a plurality of plants with an inoculum utilizing an automated inoculum spraying subsystem of a mobile inoculation system. The method additionally includes spraying the plurality of plants with a grit medium utilizing an automated grit blasting subsystem of the mobile inoculation system. Spraying the plants with the grit medium inflicts a plurality of wounds to the tissue of the plants on a plurality of surfaces of the plants. The wounds inflicted by the grit medium allow the inoculum to be absorbed into the plants to inoculate the plants.

In various other embodiments, an exemplary method includes positioning at least one grit spray nozzle of a grit blasting subsystem of a mobile inoculation system at a selected height above a ground surface from which a plurality of plants are growing, and positioning at least one inoculum spray nozzle of an inoculum spraying subsystem of the mobile inoculation system at a selected height above the ground surface from which the plants are growing. The method additionally includes transporting the mobile inoculation system across the ground surface such that the plants pass beneath, or adjacent to, the at least one inoculum spray nozzle and the at least one grit spray nozzle. The method further includes spraying the plants with a grit medium dispensed from the at least one grit spray nozzle as the plants pass beneath, or adjacent to, the at least one grit spray nozzle. Spraying the plants with the grit medium inflicts a plurality of wounds to the tissue of the plants on a plurality of surfaces of the plants. Still further, the method includes spraying the plants with an inoculum dispensed from the at least one inoculum spray nozzle as the plants pass beneath, or adjacent to, the at least one inoculum spray nozzle. The wounds inflicted by the grit medium allow the inoculum to be absorbed into the plants to inoculate the plants.

In various other embodiments, an exemplary mobile inoculation system is provided that includes a chassis frame connectable to a vehicle and a plurality of wheels rotatably connected to the chassis frame such that the mobile inoculation system can be transported across a ground surface from which a plurality of plants are growing. The system additionally includes an inoculum spraying subsystem mounted to the chassis frame. The inoculum spraying system includes at least one inoculum spray nozzle that is positionable at a selected height above the ground surface and at a location such that the plants pass beneath, or adjacent to, the at least one inoculum spray nozzle when the mobile inoculation system is transported across the ground surface. The inoculum spraying subsystem is structured and operable to spray the plants, as the plants pass beneath, or adjacent to, the at least one inoculum spray nozzle when the mobile inoculation system is transported across the ground surface, with an inoculum dispensed from the at least one inoculum spray nozzle.

The system further includes a grit blasting subsystem mounted to the chassis frame that includes at least one grit spray nozzle that is positionable at a selected height above the ground surface and at a location such that the plants pass beneath, or adjacent to, the at least one grit spray nozzle when the mobile inoculation system is transported across the ground surface. The grit blasting subsystem is structured and operable to spray the plants, as the plants pass beneath, or adjacent to, the at least one grit spray nozzle when the mobile inoculation system is transported across the ground surface, with a grit medium dispensed from the at least one grit spray nozzle. Spraying the plants with the grit medium inflicts a plurality of wounds to the tissue of the plants on a plurality of surfaces of the plants. The wounds inflicted by the grit medium allow the inoculum to be absorbed into the plants to inoculate the plants.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 1 is an isometric view of an automated mobile inoculation system for inoculating a plurality of plants, in accordance with various embodiments of the present disclosure.

FIG. 4 provides an exemplary flow chart illustrating a method for inoculating a plurality of plants by introducing pathogens into the plant tissue utilizing the automated mobile inoculation system, shown in FIG. 1, in accordance with various embodiments of the present disclosure.

Figure 5:
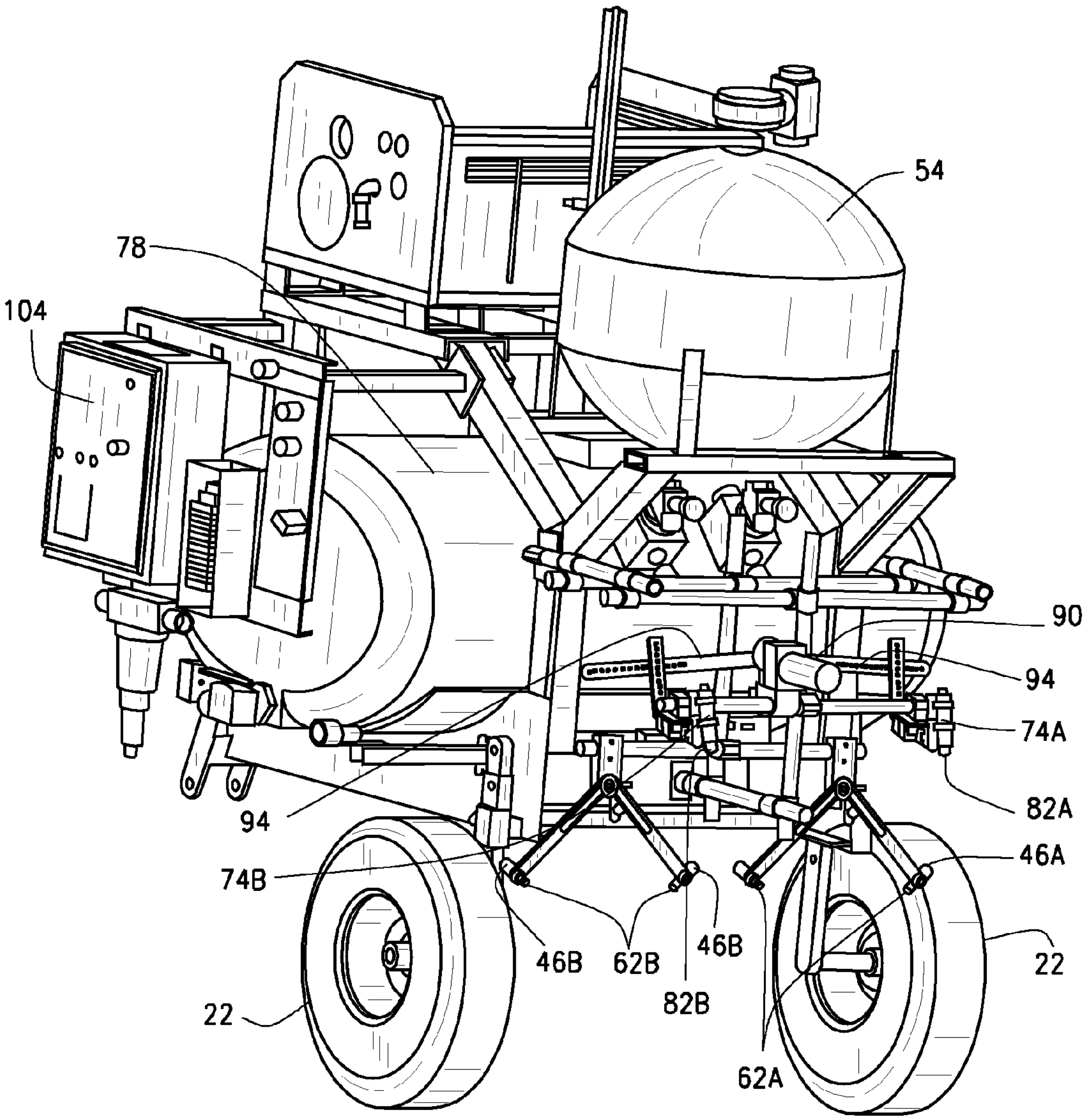

FIG. 5 is a rear view of the automated mobile inoculation system, shown in FIG. 1, having a plurality of grit spray nozzles and a plurality of sets of inoculum spray nozzles, in accordance with various other embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

Referring to FIG. 1, in various embodiments, the present disclosure provides an automated mobile inoculation system 10 that is structured and operable to inoculate a plurality of plants by introducing pathogens, e.g., bacterial, viral or fungal pathogens, into the plant tissue for disease phenotyping and/or genotyping. For example, the automated mobile inoculation system 10 can be employed to inoculate an entire test plot of plants with one or more foliar disease pathogens such as Goss' wilt, Stewart's wilt, Gray Leaf Spot, Southern Leaf Blight, Northern Leaf Blight, common rust, etc.

Figure 2:
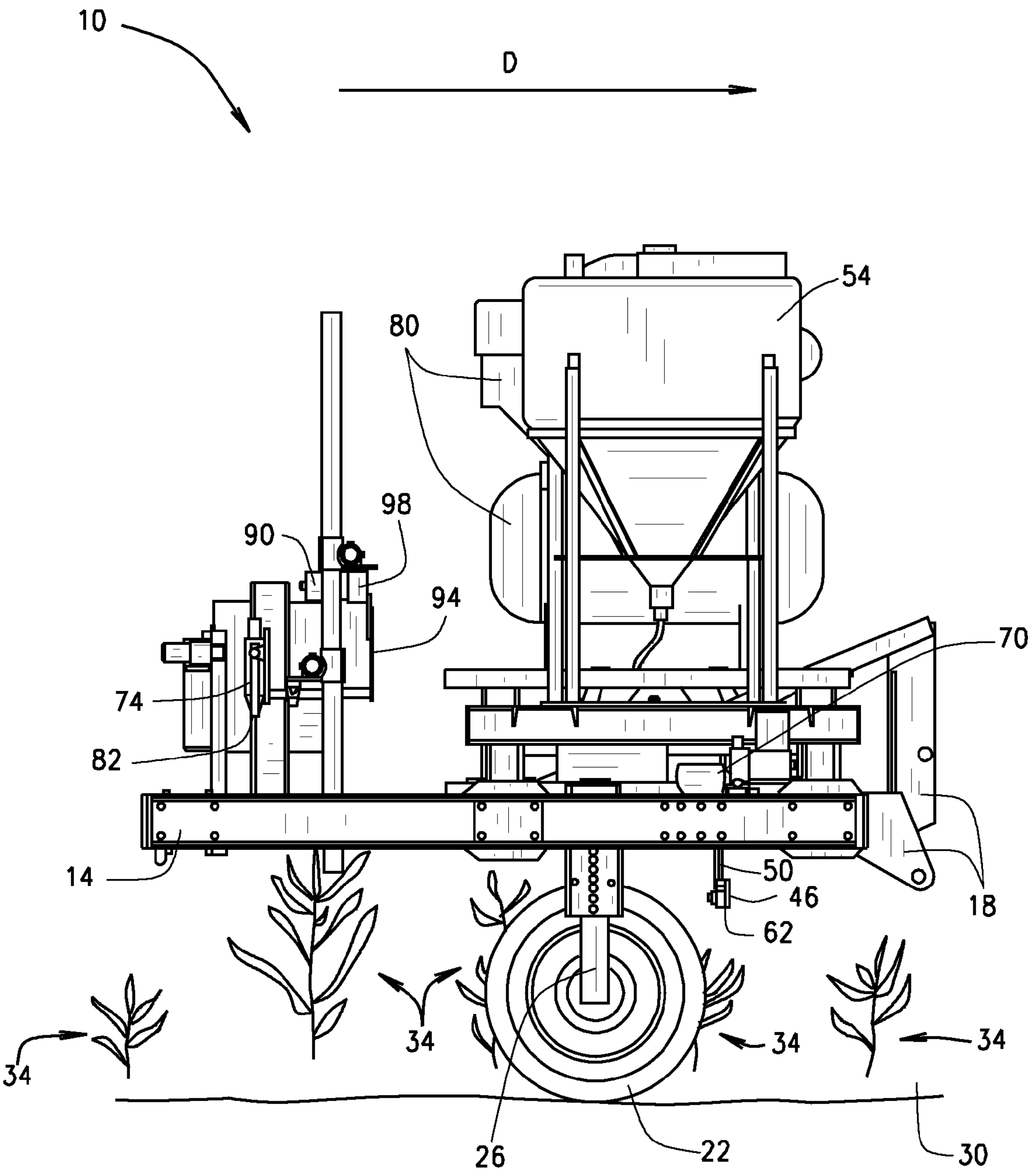
FIG. 2 is a side view of the automated mobile inoculation system, shown in FIG. 1, in accordance with various embodiments of the present disclosure.
Figure 3:
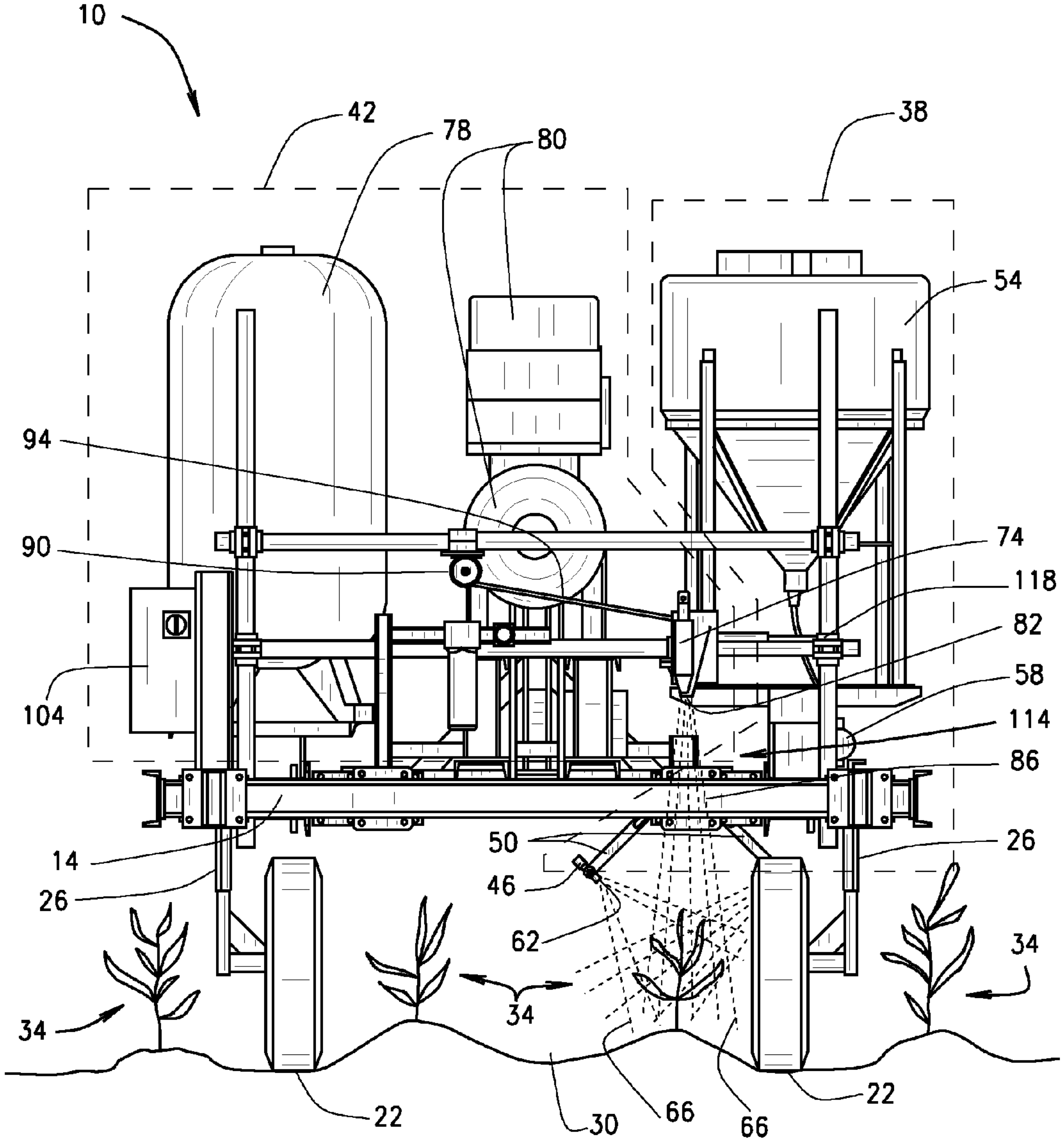
FIG. 3 is a rear view of the automated mobile inoculation system, shown in FIG. 1, in accordance with various embodiments of the present disclosure.

Referring now to FIGS. 1, 2, and 3, in various embodiments, the automated mobile inoculation system 10 includes a chassis frame 14 structured to support and have mounted thereto, various subsystems, assemblies, components, devices, apparatuses and/or mechanisms as described herein. Additionally, the chassis frame 14 is structured to be connectable to a self-propelled vehicle (not shown) via a tow assembly 18 mounted to a front portion of the chassis frame 14. The automated mobile inoculation system 10 additionally includes a plurality of wheels 22 rotatably connected to the chassis frame 14, via wheel struts 26, such that the automated mobile inoculation system 10 can be transported, e.g., towed or pulled via the self-propelled vehicle, across a ground surface 30 from which a plurality of plants 34 are growing.

In various embodiments, the plants 34 are grown in one or more rows within a field, or test plot, and the wheel base, i.e., the distance between the wheels 22, is such that the wheels will roll between the rows of plants as the automated mobile inoculation system 10 is transported across the ground surface 30 substantially parallel to the row(s) of plants.

It should be understood that the various embodiments of the automated mobile inoculation system 10, exemplarily illustrated and described herein, include various braces, beams, platforms, pedestals, stands, etc., to which various components, devices, mechanisms, systems, subsystems, assemblies and sub-assemblies described herein are coupled, connected and/or mounted and supported upon the chassis frame 14. Although such braces, beams, platforms, pedestals, stands, etc., are necessary to the construction of various embodiments of the automated mobile inoculation system 10, description of their placement, orientation and interconnections are not necessary for one skilled in the art to easily and fully comprehend the structure, function and operation of the various embodiments of the automated mobile inoculation system 10. Moreover, such braces, beams, platforms, pedestals, stands, etc., are clearly illustrated in various figures and, as such, their placement, orientation and interconnections are easily understood by one skilled in the art. Therefore, for simplicity, such braces, beams, platforms, pedestals, stands, etc., will be referred to herein merely as system support structures, absent further description of their placement, orientation and interconnections.

The automated mobile inoculation system 10 further includes an automated inoculum spraying subsystem 38 and an automated grit blasting subsystem 42 mounted to the chassis frame 14 via system support structure of the automated mobile inoculation system 10, best illustrated in FIG. 3.

Generally, the inoculum spraying subsystem 38 includes at least one inoculum spray nozzle 46 positioned, or located, at a selected height above the ground surface 30, via one or more inoculum spray nozzle arms 50. In various embodiments, the one or more inoculum spray nozzle arms 50 can be adjustable, e.g., manually or via automation, such that the at least one inoculum spray nozzle 46 can be selectably positioned, or located, at any selected height above the ground surface 30 within the range of adjustability of the one or more adjustable inoculum spray nozzle arms 50. Additionally, in various embodiments, the inoculum spray nozzle(s) 46 is/are located, via the inoculum spray nozzle arms 50 at a location, relative to the chassis frame 14, such that the plants 34 will pass beneath the inoculum spray nozzle(s) 46 as the mobile inoculation system 10 is transported across the ground surface 30 substantially parallel to the row(s) of plants 34. Alternatively, in various embodiments, the inoculum spray nozzle(s) 46 can be located, via the inoculum spray nozzle arms 50 at a location, relative to the chassis frame 14, such that the plants 34 will pass adjacent to the inoculum spray nozzle(s) 46, e.g., between a pair of inoculum spray nozzles 46, as the mobile inoculation system 10 is transported across the ground surface 30 substantially parallel to the row(s) of plants 34.

The inoculum spraying subsystem 38 further includes at least one inoculum retention tank 54 and a pump 58. The inoculum retention tank(s) 54 is/are structured to hold a supply of a selected inoculum, or inoculum mixture. The inoculum can be any desired inoculum for one or more foliar disease pathogens such as Goss' wilt, Stewart's wilt, Gray Leaf Spot, Southern Leaf Blight, Northern Leaf Blight, common rust, etc. In various embodiments, the inoculum can include a surfactant to improve adhesion of the inoculum on the plant surfaces sprayed with the inoculum, as described below.

The pump 58 is fluidly connected to the inoculum retention tank(s) 54 and the inoculum spray nozzle(s) 46, and operable to pump the inoculum from the inoculum retention tank(s) 54 to the inoculum spray nozzle(s) 46. More particularly, the pump 58 is operable to dispense the inoculum from the inoculum spray nozzle(s) 46 at a selectable pressure, e.g., 5 psi, 10 psi, 15 psi or any other desired pressure within the operational pressure range of the pump 58.

Hence, in operation, the inoculum spraying subsystem 38 is structured and operable to spray the plants 34 with an inoculum, or inoculum mixture, dispensed from the inoculum spray nozzle(s) 46 at a desired pressure as the plants 34 pass beneath, or adjacent to, the inoculum spray nozzle(s) 46 while the automated mobile inoculation system 10 is being transported across the ground surface 30.

Additionally, each inoculum spray nozzle 46 includes an inoculum spray nozzle tip 62 that disperse(s) the inoculum in an inoculum field of spray 66, best shown in FIG. 3. Moreover, the inoculum spraying subsystem 38 is structured and operable such that the dispersed inoculum field of spray 66 provides a substantially uniform coverage of the inoculum across all surfaces of the plant 34 that are exposed to the inoculum field of spray 66. That is, the inoculum spraying subsystem 38 is structured and operable to dispense and disperse the inoculum such that generally all the surfaces of the leaves and stalks of the plants 34 that are exposed to, i.e., accessible by, the spray of inoculum will receive a substantially uniform coverage of the inoculum.

For example, in various embodiments, the inoculum spray nozzle(s) 46 is/are located in a fixed position with respect to the chassis frame 14 and the inoculum spray nozzle tip 62 of each inoculum spray nozzle 46 is structured and operable to disperse the inoculum such that the inoculum spraying subsystem 38 dispenses the inoculum in an inoculum field of spray 66 that provides a substantially uniform coverage of the inoculum across all plant surfaces exposed to the inoculum field of spray 66. For example, each inoculum spray nozzle tip 62 can be structured to evenly disperse the inoculum in an even fan-like pattern, circular pattern or any other suitable pattern, that provides an inoculum field of spray 66 large enough to encompass the footprint of approximately all of the plants 34 and provides a substantially uniform coverage of the inoculum across all plant surfaces exposed to the inoculum field of spray 66.

For example, in various embodiments the inoculum spraying subsystem 38 can include a single fixed position inoculum spray nozzle 46 and the respective inoculum spray nozzle tip 62 can be structured to disperse the inoculum into an even field of spray 66 large enough to encompass the footprint of approximately all of the plants 34 and provides a substantially uniform coverage of the inoculum across all plant surfaces exposed to the inoculum field of spray 66. Or, alternatively, in various other embodiments, the inoculum spraying subsystem 38 can include a plurality of fixed position inoculum spray nozzles 46, wherein each inoculum spray nozzle 46 is positioned to dispense the inoculum onto the plants 34 from a different angle. In such embodiments, each respective inoculum spray nozzle tip 62 can be structured to disperse the inoculum into an even inoculum field of spray 66 large enough to encompass the footprint of approximately all of the plants 34, whereby each respective inoculum field of spray 66 provides a substantially uniform coverage of the inoculum across all plant surfaces exposed to the respective inoculum field of spray 66. Hence, in such embodiments, the inoculum spraying subsystem 38 provides a substantially uniform coverage of the inoculum to a greater amount or surface area of each plant 34.

In various other exemplary embodiments, the inoculum spraying subsystem 38 can include an inoculum nozzle motor 70 to which the adjustable inoculum spray nozzle arm(s) 50 are connected such that operation of the motor 70 oscillates the inoculum spray nozzle(s) 46 in a side-to-side motion that is substantially orthogonal to a direction of travel D of the mobile inoculation system 10 across the ground surface 30. In such embodiments, the inoculum spray nozzle tip(s) 62 can be structured to evenly disperse the inoculum in an even pattern, such as a fan-like pattern, a circular pattern, a shower-stream-like pattern or any other suitable pattern, whereby oscillation of the inoculum spray nozzle(s) 46 provide(s) an inoculum field of spray 66 large enough to encompass the footprint of approximately all of the plants 34. Moreover, the oscillating inoculum spray nozzle(s) 46 provide(s) a substantially uniform coverage of the inoculum across all plant surfaces exposed to the inoculum field of spray 66.

Generally, the grit blasting subsystem 42 includes at least one grit spray nozzle 74 that is mounted to system support structure to position, or locate, the grit spray nozzle(s) 74 at a selected height above the ground surface 30. In various embodiments, the at least one grit spray nozzle 74 can be mounted to system support structure via an adjustable fixture 110, or other mounting, such that the at least one grit spray nozzle 74 can be selectably positioned, or located, e.g., manually or via automation, at any selected height above the ground surface 30 within the range of adjustability of the adjustable fixture 110, or other mounting. Additionally, the grit spray nozzle(s) 74 is/are mounted to system support structure such that the plants 34 will pass beneath the grit spray nozzle(s) 74 as the mobile inoculation system 10 is transported across the ground surface 30 substantially parallel to the row(s) of plants 34. Alternatively, in various embodiments, the grit spray nozzle(s) 74 can be located, via system support structure, at a location, relative to the chassis frame 14, such that the plants 34 will pass adjacent to the grit spray nozzle(s) 74, e.g., between a pair of grit spray nozzles 74, as the mobile inoculation system 10 is transported across the ground surface 30 substantially parallel to the row(s) of plants 34.

The grit blasting subsystem 42 further includes at least one grit retention tank 78 and an engine and compressor system 80. The grit retention tank(s) 78 is/are structured to hold a supply of a small particulate matter, herein referred to as grit medium. The engine and compressor system 80 is fluidly connected to the grit retention tank(s) 78 and the grit spray nozzle(s) 74, and operable to pump the grit medium from the grit retention tank(s) 78 to the grit spray nozzle(s) 74.

Particularly, the engine and compressor system 80 is operable to dispense the grit medium from the grit spray nozzle(s) 74 at a selectable velocity, or pressure, e.g., 20 psi, 30 psi, 40 psi or any other desired pressure within the operational pressure range of the engine and compressor system 80. More particularly, the engine and compressor system 80 dispenses the grit medium from the grit spray nozzle(s) 74 at a selected velocity sufficient to create wounds in the surfaces of the plants 34 exposed to grit medium dispensed from the grit spray nozzle(s) 74, as described further below. The selected velocity can be based on various factors such as grit size, grit shape, grit to air mix ratio and the distance from the grit spray nozzle(s) 74 to the plants 34.

Hence, in operation, the grit blasting subsystem 38 is structured and operable to spray the plants 34 with a grit medium dispensed from the grit spray nozzle(s) 74 at a desired pressure, or velocity, as the plants 34 pass beneath, or adjacent to, the grit spray nozzle(s) 74 while the automated mobile inoculation system 10 is being transported across the ground surface 30, thereby creating wounds in the surfaces of the plants 34. The wounds allow the inoculum applied to the plants by the inoculum spraying subsystem 38, as described above, either prior to or subsequent to being sprayed with the grit medium, to be absorbed into the plants 34 to inoculate the plants 34, as also described further below.

The grit medium can be any grit medium suitable to be dispensed from the grit spray nozzle(s) 74 and selected to create a desired amount and severity of wounds to the plants 34 and not contaminate the inoculum applied by the inoculum spraying subsystem 38. That is, the grit medium can be any grit type and be of any size and shape suitable to create a desired amount and severity of wounds to the plants 34 without contaminating the inoculum applied to the plants 34. For example, the grit medium can comprise corn cob grit, crushed walnut shells, a mineral such as garnet, or any other suitable naturally occurring or manufactured particulate.

Additionally, each grit spray nozzle 74 includes a grit spray nozzle tip 82 that disperse(s) the grit medium in a grit medium field of spray 86, best shown in FIG. 3. Moreover, the grit blasting subsystem 42 is structured and operable such that the dispersed grit medium field of spray 86 provides a substantially uniform coverage of wounds to all surfaces of the plant 34 that are exposed to the grit medium field of spray 86. That is, the grit blasting spraying subsystem 42 is structured and operable to dispense and disperse the grit medium such that generally all of the surfaces of the leaves and stalks of the plants 34 that are exposed to, i.e., accessible by, the spray of grit medium will incur a substantially uniform coverage of wounds inflicted by the grit medium.

For example, in various embodiments, the grit medium spray nozzle(s) 74 is/are located in a fixed position with respect to the chassis frame 14 and the grit medium spray nozzle tip 82 of each grit spray nozzle 74 is structured and operable to disperse the grit medium, at the selected velocity, or pressure, such that the grit blasting subsystem 38 dispenses the grit medium in a grit medium field of spray 86 that inflicts a substantially uniform coverage of the wounds across all plant surfaces exposed to the grit medium field of spray 86. For example, each grit medium spray nozzle tip 82 can be structured to evenly disperse the grit medium at the selected velocity, or pressure, in an even fan-like pattern, circular pattern or any other suitable pattern, that provides a grit medium field of spray 86 large enough to encompass the footprint of approximately all of the plants 34 and inflicts a substantially uniform coverage of wounds across all plant surfaces exposed to the grit medium field of spray 86.

For example, in various embodiments the grit blasting subsystem 42 can include a single fixed position grit medium spray nozzle 74 and the respective grit medium spray nozzle tip 82 can be structured to disperse the grit medium into an even grit medium field of spray 86 large enough to encompass the footprint of approximately all of the plants 34 and inflicts a substantially uniform coverage of the wounds across all plant surfaces exposed to the grit medium field of spray 86. Or, alternatively, in various other embodiments, the grit blasting subsystem 42 can include a plurality of fixed position grit medium spray nozzles 74, wherein each grit medium spray nozzle 74 is positioned to dispense the grit medium onto the plants 34 from a different angle. In such embodiments, each respective grit medium spray nozzle tip 82 can be structured to disperse the grit medium into an even grit medium field of spray 86 large enough to encompass the footprint of approximately all of the plants 34, whereby each respective grit medium field of spray 86 inflicts a substantially uniform coverage of the wound across all plant surfaces exposed to the respective grit medium field of spray 86. Hence, in such embodiments, the grit blasting subsystem 42 inflicts a substantially uniform coverage of wounds to a greater amount or surface area of each plant 34.

Still further, in various other exemplary embodiments, the one or more grit spray nozzles 74 can be mounted to a respective grit nozzle shaft 88 that is rotationally mounted to the system support structure. Additionally, the grit blasting subsystem 42 can include a grit nozzle motor 90 and one or more cam linkages 94, each cam linkage 94 connected at one end to the a cam wheel 98 of the grit nozzle motor 90 and at an opposing end to a respective grit spray nozzle shaft 88. Operation of the motor 90 rotates the cam wheel 98 thereby moving the ends of the cam linkage 94, which results in oscillating the grit spray nozzle(s) 74 in a side-to-side motion that is substantially orthogonal to a direction of travel D of the mobile inoculation system 10 across the ground surface 30. In such embodiments, the grit spray nozzle tip(s) 82 can be structured to evenly disperse the grit medium in an even pattern such as a shower-stream-like pattern, a fan-like pattern, a circular pattern or any other suitable pattern, whereby oscillation of the grit spray nozzle(s) 74 provide(s) a grit medium field of spray 86 large enough to encompass the footprint of approximately all of the plants 34. Moreover, the oscillating grit spray nozzle(s) 74 inflict(s) a substantially uniform coverage of wounds across all plant surfaces exposed to the grit medium field of spray 86.

In various embodiments, the operations of the inoculum spraying subsystem 38 and the grit blasting subsystem 42 can be controlled by a computer based controller 102 included as part of (or alternatively, peripheral to) an electrical cabinet 104. The controller 102 and electrical cabinet 104 control and distribute electricity to the various components of the inoculum spraying subsystem 38 and the grit blasting subsystem 42. The electricity can be provided by an onboard generator or battery unit (not shown) or by an electrical system of the self-propelled vehicle.

Additionally, in various embodiments, the automated mobile inoculation system 10 can include a global positioning system (GPS) 106 operable to monitor or track the movement of the automated mobile inoculation system 10 along the rows of plants 34, thereby identifying the location of the automated mobile inoculation system 10 with respect to the rows of plants 34. More specifically, based on the tracked movement of the automated mobile inoculation system 10 with respect to the rows of plants 34, via the GPS 106, the controller 102 can control the application of the inoculum and/or the grit medium. That is, as the automated mobile inoculation system 10 reaches the end of a row of plants 34, as determined by the GPS 106, the controller 102 can cease the application of the inoculum, via an inoculum flow control device 114, and/or the grit medium, via a grit medium flow control device 118, in order to conserve the amount of inoculum and/or the grit medium used during operation of the automated mobile inoculation system 10. Similarly, as the automated mobile inoculation system 10 approach the beginning of a row of plants 34 to be inoculated, as determined by the GPS 106, the controller 102 can initiate the application of the inoculum and/or the grit medium.

Referring now to FIG. 4, a flow chart 200 is provided to illustrate the operation of the automated mobile inoculation system 10 to inoculate the plurality of plants 34 by introducing pathogens into the tissue of the plants 34, in accordance with various embodiments of the present disclosure. As indicated at 202, initially, the inoculum and grit spray nozzles 46 and 74 are positioned at a selected height above the ground surface 30. Once the inoculum and grit spray nozzles 46 and 74 are positioned at the selected height, the automated mobile inoculation system 10 can be transported, e.g., pulled or towed by a self-propelled vehicle, across the ground surface 30 such that the plants 34 pass beneath, or adjacent to, the inoculum spray nozzle(s) 46 and the grit spray nozzle(s) 74 as the automated mobile inoculation system 10 is transported across the ground surface 30, as indicated at 204.

In various implementations, as indicated at 206, as the automated mobile inoculation system 10 travels across the ground surface 30, passing over the plants 34, each plant 34 is sprayed with an inoculum dispensed from the inoculum spray nozzle(s) 46, and dispersed by the inoculum spray nozzle tip(s) 62, to provide a substantially uniform coverage of inoculum of inoculum across all plants surfaces, i.e., to the leaf and stalk surfaces of the plants 34 that are exposed to the inoculum field of spray 66, as described above. Additionally, as indicated at 208, as the automated mobile inoculation system 10 travels across the ground surface 30, passing over the plants 34, each plant 34 is sprayed with a grit medium dispensed from the grit spray nozzle(s) 74, and dispersed by the grit spray nozzle tip(s) 82, to inflict a substantially uniform coverage of wounds to the tissue of the plants, i.e., to the leaf and stalk surfaces that are exposed to the grit medium field of spray 86, as described above.

Subsequently, the inoculum is absorbed into the plant surfaces via the wounds, thereby inoculating the plants 34, as indicated at 210.

It should be understood that the spraying of the plants 34 with the inoculum, as described above, and the spraying of the plants with the grit medium, as described above, can occur whereby the plants 34 are first sprayed with the grit medium and subsequently with the inoculum, or sprayed first with the inoculum and subsequently with the grit medium. Hence, in various embodiments, the flow chart 200 could illustrate the spraying of the inoculum and the grit medium, as indicated at 206 and 208, in reverse order and remain within the scope of the present disclosure. Or, alternatively, in various embodiments, the flow chart 200 could illustrate the spraying of the grit medium and the inoculum, as indicated at 206 and 208, as being done substantially simultaneously and remain within the scope of the present disclosure. In any of these implementations, the inoculum is allowed to absorb into the plant surfaces via the wounds to inoculate the plants 34.

Additionally, although the automated mobile inoculation system 10 is generally illustrated throughout the figures as being structured and operable to inoculate a single row of plants 34 at a time, it should be easily and readily understood by one skilled in the art, that the automated mobile inoculation system 10 as described herein can be structured and operable to substantially simultaneously inoculate a plurality of rows of plants 34. For example, as illustrated in FIG. 5, in various embodiments the mobile inoculation system 10 can include one or more, e.g., two, first inoculum spray nozzles 46A and a corresponding one or more, e.g., one, first grit spray nozzle 74A, and further include one or more, e.g., two, second inoculum spray nozzles 46B and a corresponding one or more, e.g., one, second grit spray nozzle 74B. Accordingly, the first inoculum spray nozzle(s) 46A and first grit spray nozzle(s) 74A are structured and operable to inoculate a first row of plants, while the second inoculum spray nozzle(s) 46B and second grit spray nozzle(s) 74B are structured and operable to substantially simultaneously inoculate a second row of plants as the automated mobile inoculation system 10 is transported, e.g., towed or pulled, across a ground surface 30.

Furthermore, as should be easily and readily understood by one skilled in the art, that the automated mobile inoculation system 10 as described herein can be similarly structured to include a third, fourth, or more set of inoculum spray nozzle(s) 46 and corresponding grit spray nozzle(s) 74 to simultaneously inoculate three, four, or more rows of plants as the automated mobile inoculation system 10 is transported, e.g., towed or pulled, across a ground surface 30.

Hence, as described herein, the automated mobile inoculation system 10 is structured and operable to provide a substantially uniform coverage of the inoculum and wounds to the exposed surfaces of the plants 34, regardless of the size of the plants 34, that is, as long as the plant height is less than the selected height of the inoculum and grit medium spray nozzles 46 and 74. Therefore, the automated mobile inoculation system 10, as described herein, provides a substantially uniform coverage of infection across the exposed plant surfaces. More importantly, the automated mobile inoculation system 10, as described herein, provides absorption of the inoculum into the stalks of the plants 34, thereby providing systemic infections. Still more importantly, the automated mobile inoculation system 10, as described herein, provides a substantially consistent incidence of infection in the plants 34, i.e., a consistent infection rate, e.g., approximately 85% to 95% consistently.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A method for inflicting a plurality of wounds to the tissues of plants, said method comprising:

spraying a plurality of plants with a grit medium consisting essentially of particulate matter, utilizing an automated mobile plant wounding system such that the grit medium impacts the plants and inflicts a plurality of wounds to the tissue of the plants.

2. The method of claim 1, wherein spraying the plants with the grit medium comprises:

positioning at least one grit spray nozzle of the wounding system at a selected height above a ground surface from which the plants are growing;

transporting the mobile plant wounding system across the ground surface such that the plants pass beneath or adjacent the at least one grit spray nozzle; and dispensing the grit medium from the at least one grit spray nozzle onto the plants as the plants pass beneath or adjacent the at least one grit spray nozzle.

3. The method of claim 2, wherein dispensing the grit medium from the at least one grit spray nozzle comprises dispersing the grit medium in a grit medium field of spray such that all plant surfaces exposed to the grit medium field of spray incur a substantially uniform coverage of wounding across all the exposed surfaces.

4. The method of claim 3, wherein dispersing the grit medium in a grit medium field of spray comprises spraying the grit medium in fan-like pattern from the at least one grit spray nozzle.

5. The method of claim 3, wherein dispersing the grit medium in a grit medium field of spray comprises:

spraying the grit medium from the at least one grit spray nozzle; and oscillating the at least one grit spray nozzle in a side-to-side motion substantially orthogonal to a direction of travel of the mobile plant wounding system across the ground surface.

6. The method of claim 1 further comprising:

tracking the movement of the mobile plant wounding system along rows of plants utilizing a global positioning system of the mobile plant wounding system;

identifying the location of the mobile plant wounding system with respect to the rows of plants; and controlling the spraying of the grit medium based on the location of the mobile plant wounding system.

7. The method of claim 1 further comprising spraying the wounded plants with an inoculum such that the inoculum is absorbed into the plants.

8. The method of claim 1 further comprising spraying the wounded plants with an inoculum comprising a pathogen such that pathogens are absorbed into the plants.

9. The method of claim 1 further comprising an least one of:

reducing the health of at least one plant as a result of the inflicted wounds;

reducing the survivability of at least one plant as a result of the inflicted wounds; and reducing the function of at least one plant organ as a result of the inflicted wounds.

10. The method of claim 1 further comprising causing at least one plant to not recover as a result of the inflicted wounds.

11. A method for inflicting a plurality of wounds to the tissues of plants, said method comprising:

positioning at least one grit spray nozzle of an automated mobile plant wounding system at a selected height above a ground surface from which a plurality of plants are growing;

transporting the mobile plant wounding system across the ground surface such that the plants pass beneath or adjacent and the at least one grit spray nozzle; and spraying the plants with a grit medium consisting essentially of particulate matter dispensed from the at least one grit spray nozzle as the plants pass beneath or adjacent the at least one grit spray nozzle to inflict a plurality of wounds to the tissue of a plurality of surfaces of the plants.

12. The method of claim 11, wherein dispensing the grit medium from the at least one grit spray nozzle comprises dispersing the grit medium in a grit medium field of spray such that all plant surfaces exposed to the grit medium field of spray incur a substantially uniform coverage of wounding across all the exposed surfaces.

13. The method of claim 12, wherein dispersing the grit medium in a grit medium field of spray comprises spraying the grit medium in fan-like pattern from the at least one grit spray nozzle.

14. The method of claim 12, wherein dispersing the grit medium in a grit medium field of spray comprises:

spraying the grit medium from the at least one grit spray nozzle; and oscillating the at least one grit spray nozzle in a side-to-side motion substantially orthogonal to a direction of travel of the mobile plant wounding system across the ground surface.

15. The method of claim 11 further comprising:

tracking the movement of the mobile plant wounding system along rows of plants utilizing a global positioning system of the mobile plant wounding system;

identifying the location of the mobile plant wounding system with respect to the rows of plants; and controlling the spraying of the grit medium based on the location of the mobile plant wounding system.

16. An automated mobile plant wounding system for inflicting a plurality of wounds to the tissues of plants, said system comprising:

a chassis frame connectable to a mobile platform;

a plurality of wheels rotatably connected to the chassis frame such that the mobile plant wounding system can be transported across a ground surface from which a plurality of plants are growing; and a grit blasting subsystem mounted to the chassis frame, the grit blasting subsystem including at least one grit spray nozzle that is positionable at a selected height above the ground surface and at a location such that plants pass beneath or adjacent the at least one grit spray nozzle when the mobile plant wounding system is transported across the ground surface, the grit blasting subsystem structured and operable to spray the plants, as the plants pass beneath or adjacent the at least one grit spray nozzle when the mobile plant wounding system is transported across the ground surface, with a grit medium consisting essentially of particulate matter dispensed from the at least one grit spray nozzle to inflict a plurality of wounds to the tissue of a plurality of surfaces of the plants.

17. The system of claim 16, wherein the grit blasting subsystem comprises a compressor assembly structured and operable to dispense the grit medium from the at least one grit spray nozzle at a velocity sufficient to create the wounds to the plant tissue.

18. The system of claim 17, wherein each of the at least one grit spray nozzles comprises a grit spray nozzle tip structured and operable to disperse the grit medium such that the grit spraying subsystem dispenses the grit medium in a grit medium field of spray that inflicts a substantially uniform coverage of wounding across all plant surfaces exposed to the grit medium field of spray.

19. The system of claim 17, wherein each of the at least one grit spray nozzles comprises a grit spray nozzle tip structured and operable to disperse the grit, and the grit spraying subsystem further includes a motor structured and operable to oscillate the at least one grit spray nozzle in a side-to-side motion such that the grit spraying subsystem dispenses the grit medium in a grit medium field of spray that inflicts a substantially uniform coverage of wounding across all plant surfaces exposed to the grit medium field of spray.

20. The system of claim 16 further comprising an inoculum spraying subsystem mounted to the chassis frame, the inoculum spraying system including at least one inoculum spray nozzle that is positionable at a selected height above the ground surface and at a location such that the plants pass beneath or adjacent to the at least one inoculum spray nozzle when the mobile inoculation system is transported across the ground surface, the inoculum spraying subsystem structured and operable to spray the plants, as the plants pass beneath or adjacent to the at least one inoculum spray nozzle when the mobile inoculation system is transported across the ground surface, with an inoculum dispensed from the at least one inoculum spray nozzle, whereby the inoculum is absorbed into the plants via the inflicted wounds.

* * * * *